(12) United States Patent
Parr et al.

(10) Patent No.: US 9,562,748 B2
(45) Date of Patent: Feb. 7, 2017

(54) METHODS AND APPARATUSES FOR CREATING A VISUAL EFFECT ON A RUBBER ARTICLE

(71) Applicant: Bridgestone Americas Tire Operations, LLC, Nashville, TN (US)

(72) Inventors: Richard S. Parr, Canton, OH (US); Kevin E. Scheifele, Atwater, OH (US); Jon I. Stuckey, Lorain, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 14/321,400

(22) Filed: Jul. 1, 2014

(65) Prior Publication Data

US 2015/0004335 A1  Jan. 1, 2015

Related U.S. Application Data

(60) Provisional application No. 61/841,527, filed on Jul. 1, 2013.

(51) Int. Cl.
*B32B 3/10* (2006.01)
*F41H 3/00* (2006.01)

(52) U.S. Cl.
CPC ............... *F41H 3/00* (2013.01); *Y10T 428/24* (2015.01); *Y10T 428/24355* (2015.01); *Y10T 428/24438* (2015.01); *Y10T 428/24479* (2015.01); *Y10T 428/24802* (2015.01)

(58) Field of Classification Search
USPC .................................................... 428/195.1
See application file for complete search history.

(56) References Cited

U.S. PATENT DOCUMENTS

| | | | |
|---|---|---|---|
| 1,448,286 A | 3/1923 | Comstock | |
| 4,198,774 A | 4/1980 | Roberts et al. | |
| 4,224,268 A | 9/1980 | Merli et al. | |
| 4,767,481 A | 8/1988 | Bryant et al. | |
| D330,879 S | 11/1992 | Porto et al. | |
| 5,549,938 A | 8/1996 | Nesbitt | |
| 5,645,660 A | 7/1997 | Attinello et al. | |
| 5,807,446 A * | 9/1998 | Ratliff, Jr. ............... | B60C 13/02 152/523 |

(Continued)

FOREIGN PATENT DOCUMENTS

| | | |
|---|---|---|
| CN | 1055047 C | 8/2000 |
| CN | 2454163 Y | 10/2001 |

(Continued)

OTHER PUBLICATIONS

"The Strange Story of Rubber." Reader's Digest, vol. 72, Jan. 1958.

(Continued)

*Primary Examiner* — Christopher Polley
(74) *Attorney, Agent, or Firm* — Shaun J. Fox; Thomas Y. Kendrick

(57) ABSTRACT

Various methods and apparatuses for creating a visual effect on a rubber article are disclosed. In one embodiment, a rubber article having a visual effect is provided, the rubber article comprising: a surface having at least one surface feature; and wherein the at least one surface feature comprises a plurality of linear elements creating a camouflage-shaped appearance.

21 Claims, 9 Drawing Sheets

(56) References Cited

U.S. PATENT DOCUMENTS

| | | | |
|---|---|---|---|
| 5,939,002 A | 8/1999 | Heindel | |
| 5,996,863 A | 12/1999 | Burke | |
| 6,536,490 B2 | 3/2003 | Rooney | |
| D477,807 S | 7/2003 | Zanzig et al. | |
| D478,861 S | 8/2003 | Zanzig et al. | |
| D480,041 S | 9/2003 | Zanzig et al. | |
| D482,317 S | 11/2003 | Zanzig et al. | |
| D483,000 S | 12/2003 | Zanzig et al. | |
| D483,001 S | 12/2003 | Zanzig et al. | |
| D483,318 S | 12/2003 | Zanzig et al. | |
| D491,136 S | 6/2004 | Zanzig et al. | |
| 7,118,643 B1 | 10/2006 | Mellet et al. | |
| 7,156,936 B2 | 1/2007 | Frantz et al. | |
| 7,255,762 B2 | 8/2007 | Zanzig et al. | |
| 7,530,378 B2 | 5/2009 | Puhala et al. | |
| 7,883,326 B1 | 2/2011 | Parmelee | |
| 8,317,121 B2 | 11/2012 | Tracey | |
| 2002/0189733 A1 | 12/2002 | Rooney | |
| 2003/0140999 A1 | 7/2003 | Smith et al. | |
| 2003/0234067 A1 | 12/2003 | Kataoka et al. | |
| 2004/0020575 A1 | 2/2004 | Zanzig et al. | |
| 2004/0144462 A1 | 7/2004 | Zanzig et al. | |
| 2005/0000616 A1 | 1/2005 | Frantz et al. | |
| 2005/0081975 A1 | 4/2005 | Sano | |
| 2005/0280307 A1 | 12/2005 | Wood | |
| 2006/0032569 A1* | 2/2006 | Zimmer et al. | 152/524 |
| 2006/0191617 A1 | 8/2006 | Byrne | |
| 2007/0075508 A1 | 4/2007 | Miller et al. | |
| 2008/0073018 A1 | 3/2008 | Brei et al. | |
| 2010/0139832 A1 | 6/2010 | Rittweger | |
| 2010/0258231 A1 | 10/2010 | Nakamura | |
| 2011/0018020 A1 | 1/2011 | Jagt | |
| 2013/0000808 A1 | 1/2013 | Ishida | |

FOREIGN PATENT DOCUMENTS

| | | |
|---|---|---|
| CN | 1533924 A | 10/2004 |
| CN | 102910038 A | 2/2013 |
| EP | 0576892 A1 | 1/1994 |
| EP | 1382426 B1 | 2/2007 |
| JP | 8-318716 A | 12/1996 |
| JP | 2001072814 A | 3/2001 |
| JP | 2003053911 A | 2/2003 |
| JP | 2006143295 A | 6/2006 |
| JP | 2007320172 A | 12/2007 |
| JP | 2012101752 A | 5/2012 |
| JP | 2013-71651 A | 4/2013 |

OTHER PUBLICATIONS

Bae, Geun Tae, International Search Report with Written Opinion from PCT/US2014/045104, 13 pp. (Oct. 22, 2014).
Apollo Vredestein B.V.; Uniquely Customised Design by Vredestein; Press Release; Mar. 7, 2013; p. 1; http://www.vredestein.com/autobanden/nieuws/298/uniquely-customised-design-by-vredestein.
Hamann Motorsport; Hamann Vredestein Ultrac Vorti R; Press Release; Apr. 7, 2013; p. 1; http://www.hamann-motorsport.com/en/special/news/news-detail/?no_cache=1&tx_ttnews%5Bitt_news%5D=20.
Photograph of mold design on tire sidewall; Aug. 6, 2015; one page; Akron, OH.
First Office Action from Chinese Patent Application No. 201480037920.9 filed Jul. 1, 2014, mailing date of Nov. 2, 2016, pp. 1-8.
English Machine Translation of JP2013071651A.
English Machine Translation of JP08318716A.
English Machine Translation of CN1055047C.
English Machine Translation of CN102910038A.
English Machine Translation of CN2454163Y.
English Machine Translation of CN1533924A.

\* cited by examiner

600

Providing a mold for a rubber article, wherein the mold comprises a negative of at least one of surface features, letters, or numbers to be provided on the rubber element, wherein the surface features, letters, or numbers comprise at least one of a plurality of linear elements, a plurality of non-linear elements, a glossy appearance, a carbon fiber appearance, contrasting glossy and textured lettering, shadowed lettering, a galvanized steel appearance, a knurled appearance, a leather appearance, a camouflaged appearance, a leaf appearance, a tree appearance, and a tree bark appearance. — 602

Application of uncured rubber material to the mold under appropriate temperature and pressure for the requisite duration to achieve vulcanization. — 604

FIG. 6

METHODS AND APPARATUSES FOR CREATING A VISUAL EFFECT ON A RUBBER ARTICLE

CROSS-REFERENCE TO RELATED APPLICATIONS

This application claims priority from U.S. Provisional Patent Application No. 61/841,527, filed on Jul. 1, 2013, which is incorporated by reference herein in its entirety.

BACKGROUND

Many rubber articles, such as tires, incorporate text, aesthetic designs, and other visual effects on the article's surface. Such elements may be used to convey information about the brand, style, type, size, performance, rating, and intended operating conditions of the article. Such elements may also be directed toward making the article more visually appealing to a purchaser or user of the product. Many rubber articles, such as tires, are comprised of solid black materials that offer very little in the way of contrast in the surface of the rubber article.

The elements noted above are made up of either indentations (e.g. concave portions) or protrusions (e.g., convex portions) in the surface of the rubber article. Emphasis of a particular article is achieved by increasing the depth or height of the indentation or protrusion, respectively. A rubber article is typically molded under high pressures and temperatures inside of a mold, requiring sophisticated venting at the mold-rubber interface to ensure that the rubber fully contacts the mold where intended, especially at or around mold elements intended to create indentations or protrusions. The site of a protrusion or indentation in a rubber article often generates a stress riser in the article, resulting in a potential weak point that may necessitate use of additional, thicker material to overcome.

Use of additional or thicker material to overcome stress risers in rubber articles results in a rubber article that is heavier than necessary, and which requires more material than is otherwise necessary. Improved methods and apparatuses are needed for creating visual effects on a rubber article.

SUMMARY

In one embodiment, a rubber article comprising a visual effect is provided, the rubber article comprising: a surface having at least one surface feature; and wherein the at least one surface feature comprises a plurality of linear elements creating a camouflage-shaped appearance.

In another embodiment, a rubber article having a visual effect is provided, the rubber article comprising: a surface comprising at least one surface feature; wherein the at least one surface feature comprises at least one of: a plurality of non-linear elements, a carbon fiber appearance, a contrasting glossy and textured lettering, a shadowed lettering, a galvanized steel appearance, a knurled appearance, a leather appearance, a camouflage-shaped appearance, a leaf appearance, a tree appearance, a tree bark appearance, and an image in shallow relief; and wherein the at least one surface feature comprises at least one element having a spacing between about 0.025 mm and about 0.609 mm.

In another embodiment, a rubber article having a visual effect is provided, the rubber article comprising: a surface having at least two surface features, each of the at least two surface features being contained within distinct areas; wherein each of the at least two surface features comprise a plurality of linear elements, the plurality of linear elements have a spacing between about 0.025 mm and about 0.609 mm; and wherein each of the at least two surface features interacts with light to create a shade of a color.

In another embodiment, a rubber article comprising a visual effect is provided, the rubber article comprising: a surface comprising at least one surface feature; wherein the at least one surface feature comprises at least one of: a plurality of linear elements, a plurality of non-linear elements, a glossy finish, a carbon fiber appearance, a contrasting glossy and textured lettering, a shadowed lettering, a galvanized steel appearance, a knurled appearance, a leather appearance, a camouflage-shaped appearance, a leaf appearance, a tree appearance, a tree bark appearance, and an image in shallow relief; and wherein the at least one surface feature comprises at least one element having a depth between about 0.025 mm and about 0.305 mm, a width between about 0.025 mm and about 0.508 mm, and a spacing between about 0.025 mm and about 0.609 mm.

In one embodiment, a method for creating a visual effect in a rubber article is provided, the method comprising: providing a mold for a rubber article, wherein the mold comprises a negative of surface features to be provided on the rubber article, wherein the surface features comprise at least one of a plurality of linear elements, a plurality of non-linear elements, a glossy finish, a carbon fiber appearance, contrasting glossy and textured lettering, shadowed lettering, a galvanized steel appearance, a knurled appearance, a leather appearance, a camouflage-shaped appearance, a leaf appearance, a tree appearance, a tree bark appearance, and an image in shallow relief; wherein the surface features comprise at least one element having a depth between about 0.025 mm and about 0.305 mm, a width between about 0.025 mm and about 0.508 mm, and a spacing between about 0.025 mm and about 0.609 mm; and applying uncured rubber material to the mold to effect vulcanization of the rubber material.

In another embodiment, a method for creating a visual effect in a tire through treatment of a tire mold is provided, the method comprising: providing a tire mold for a tire; applying a masking material to a surface of the tire mold; selectively removing at least a portion of the masking material to expose the portions of the surface of the tire mold to be treated; and applying an acid to the tire mold to chemically etch the exposed portions of the surface of the tire mold.

In another embodiment, a method for creating a visual effect in a tire through treatment of a tire mold is provided, the method comprising: providing a tire mold for a tire; and etching a surface of the tire mold with a laser to produce a negative of surface features to be provided on the tire.

In another embodiment, a method for creating a visual effect in a tire through treatment of a tire mold is provided, the method comprising: providing a tire mold for a tire; and polishing at least a portion of the tire mold to achieve a desired glossiness in the tire.

In another embodiment, a rubber article comprising a visual effect is provided, the rubber article comprising: a surface comprising at least one surface feature; and wherein the at least one surface feature comprises a plurality of linear elements creating a camouflage-shaped appearance.

In another embodiment, a rubber article comprising a visual effect is provided, the rubber article comprising: a surface comprising at least one surface feature; wherein the at least one surface feature comprises an image in shallow relief.

BRIEF DESCRIPTION OF THE DRAWINGS

The accompanying figures, which are incorporated in and constitute a part of the specification, illustrate various example methods and apparatuses, and are used merely to illustrate various example embodiments. In the figures, like elements bear like reference numerals.

FIG. 6 illustrates a method for creating a visual effect in a rubber article.

DETAILED DESCRIPTION

Figure 1:
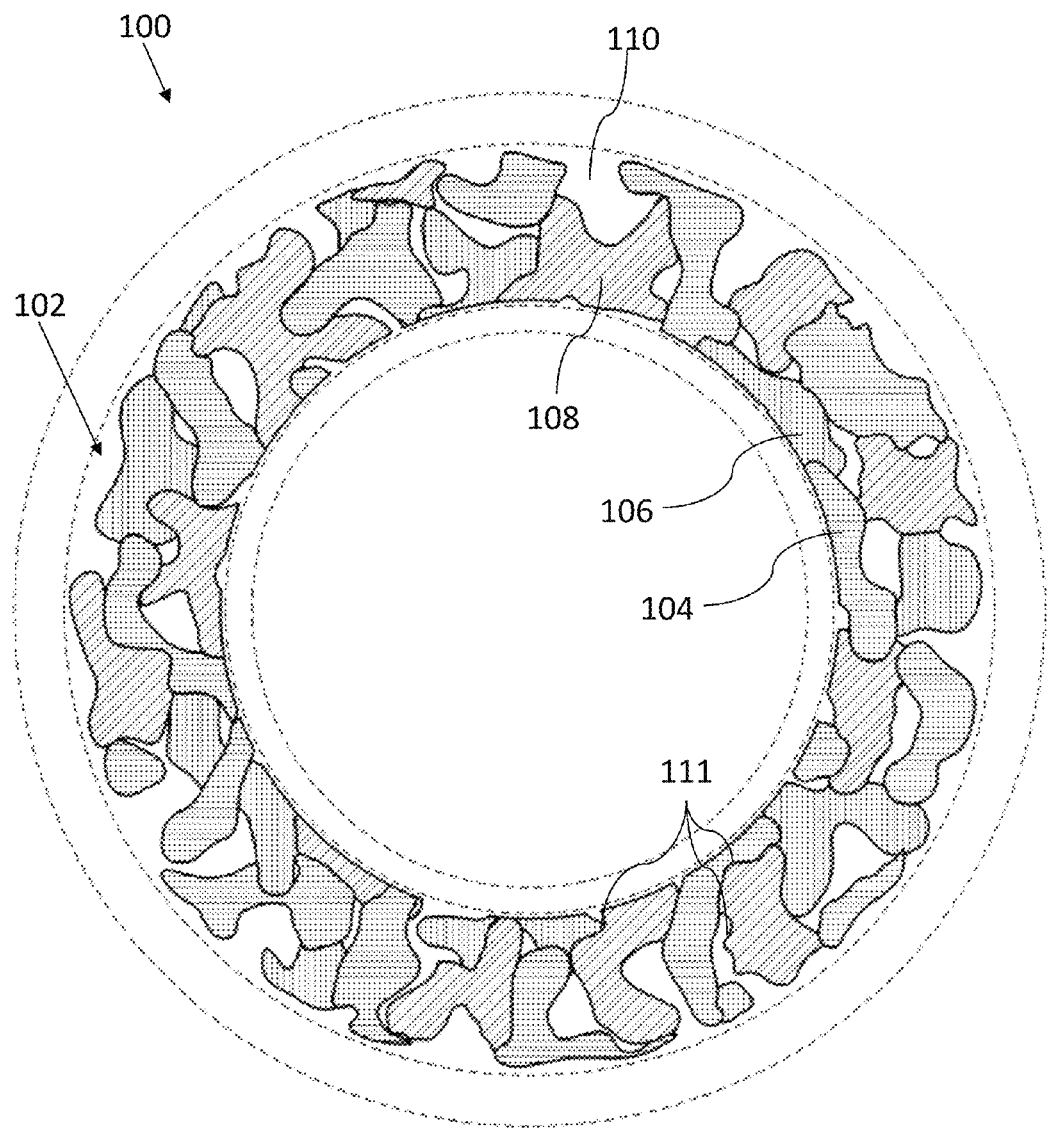
FIG. 1 illustrates a side view of an example arrangement of a rubber article comprising at least one visual effect.

FIG. 1 illustrates a side view of an example arrangement of a rubber article 100 comprising at least one visual effect. Rubber article 100 includes at least a surface 102. Rubber article 100 includes at least one surface feature, such as surface features 104, 106, and 108. Rubber article 100 may include at least one substantially non-textured area, such as area 110.

Rubber article 100 may include any of a variety of items molded from rubber. By way of example, rubber article 100 may include any of a tire, an air spring, rubber roofing material, rubber boots or protective clothing, or vehicle accessories such as mud flaps. Molding of rubber article 100 often includes vulcanization, which involves the application of high temperatures and pressures to rubber material within the confines of a mold. Rubber article 100 adopts a shape that is a negative of the mold. That is, a protrusion in a mold results in an indentation in rubber article 100.

One problem common to rubber molding and vulcanization is failure of rubber material to properly flow into various parts of the mold as a result of trapped air, often resulting in thin, misshapen, or insufficient material at that point in the rubber article. One solution is the forming of vents in the mold at these sites of poor material flow. The vents permit air trapped between the rubber material and the mold to evacuate to allow the rubber material to fully contact the mold.

Another problem common to rubber molding and vulcanization is pollution of indentations in the mold with debris, including particles of rubber material, a vapor contaminate produced during vulcanization, and carbon. This debris must be periodically removed from the mold to prevent contamination and/or less than adequate molding of later rubber articles formed in the mold.

Surface 102 may include any surface on rubber article 100. Surface 102 may be a tire sidewall. Surface 102 may be at least one of a tire sidewall, tire shoulder, tire tread, tire groove, tire rib, and tire bead area. Surface 102 may include any exterior surface on rubber article 100 where visual effects are desired.

Surface feature 104 may include a series of linear elements oriented in a substantially horizontal direction. Surface feature 106 may include a series of linear elements oriented in a substantially vertical direction. Surface feature 108 may include a series of linear elements oriented in a substantially diagonal direction. Each of surface features 104, 106, and 108 may be oriented in directions that are about 45 degrees from one another.

In another embodiment, each of surface features 104, 106, and 108 are oriented in any of various directions. Rubber article 100 may include at least one surface feature. Rubber article 100 may include more than three surface features (e.g., rubber article 100 includes surface features in addition to surface features 104, 106, and 108), each comprising linear elements oriented in any of various directions.

The number of independent surface features, such as surface features 104, 106, and 108 may be dependent upon the angle of linear elements contained in each surface feature. That is, surface features having linear elements with three different angles (e.g., 0 degrees, 45 degrees, and 90 degrees) yield three different shades of surface features. Similarly, surface features having linear elements with four different angles (e.g., 0 degrees, 30 degrees, 60 degrees, and 90 degrees) may yield four different shades of surface features. Surface features having linear elements with two different angles (e.g., 0 degrees and 90 degrees) may yield two different shades of surface features. Separating the angles of linear elements in surface features as much as possible may create the greatest contrast possible between those surface features. It may be desirable to create the greatest contrast possible between surface features, or it may be desirable to create more subtle contrast between surface features. It may be desirable to create greater contrast between some surface features and less, or subtle contrast, between other surface features. Surface features may include any angle, including any angle between 0 degrees and 180 degrees.

Surface features 104, 106, and 108 may include a series of linear elements. Surface features 104, 106, and 108 may include linear elements including a series of linear protrusions and indentations oriented adjacent one another, to create a shallow relief. The arrangement of the series of linear protrusions and indentations oriented adjacent one another may interact with light to reflect a certain shade of color. The arrangement of the series of linear protrusions and indentations oriented contiguous one another. For instance, light from the sun, overhead lights, or street lights may be oriented substantially above rubber article 100. The light may shine down and encounter substantially horizontal linear elements (e.g., surface feature 104) on a black rubber article 100, in which case the light may reflect off of a portion of the horizontal linear protrusions. The horizontal linear protrusions may also block light and cause a shadow within the horizontal linear indentations. Such a horizontal surface feature 104 may appear to the eye as a mixture of some lighter color (e.g., reflected light) and darker color (e.g., shadows) causing an overall appearance of a dark gray color.

In another example, light from the sun or a street light may shine down and encounter substantially vertical linear elements (e.g., surface feature 106) on a black rubber article 100. In such a case, the light may reflect off of both the vertical linear protrusions and the vertical linear indentations, which may appear to the eye as a gray color that is lighter than that exhibited by horizontal surface feature 104.

In one embodiment, each of surface features 104, 106, and 108 include linear elements oriented in different directions. Each of surface features 104, 106, and 108, as a result of the orientation of the individual linear elements, may interact with light to create a contrast appearance between surface features 104, 106, and 108. Rubber article 100 may be black in color, and areas of surface features 104, 106, and 108 interact with light to create the appearance of various shades of black and gray. The various shades of black and gray may create a contrast appearance between surface features 104, 106, and 108. More or fewer surface features may be provided, each creating contrasting appearances or various different shades of black and gray. Rubber article 100 may be any color, including for example, colors other than black. Rubber article 100 containing one or more surface feature may interact with light to create a contrast appearance between the surface features, such that each of the surface features may include distinct shades of the color of rubber article 100.

In one embodiment, surface features 104, 106, and 108 are contained within areas having any of a variety of shapes. At least one of surface features 104, 106, and 108 may be contained within areas having irregular shapes. At least one of surface features 104, 106, and 108 may be contained within areas having irregular shapes, similar to a camouflage-shaped pattern. At least one of surface features 104, 106, and 108 may be contained within areas having irregular shapes, and each of the irregular shapes adopts any of various shades of black and gray to create a contrast appearance between the irregular shapes.

Camouflage, as described herein, may refer to an article having a mottled design. The camouflage may include streaks or patches of varying shades of color. Surface features 104, 106, and 108 may be oriented adjacent one another and may exhibit varying shades of color, such that the varying shades mimic the mottled design commonly found in a camouflage pattern. Surface features 104, 106, and 108 may be oriented contiguous one another. Camouflage, as used herein, may refer not to a pattern of varying colors, but rather to a pattern of varying shades of colors.

A camouflage-shaped pattern, as described herein, may refer to an article having distinct areas containing surface features 104, 106, and 108, patterned in a manner similar to common military camouflages, hunting camouflages, and the like.

Surface features 104, 106, and 108 may be contained within distinct areas. Surface features 104, 106, and 108 may be contained within distinct areas oriented such that the surface features are substantially evenly distributed. Surface features 104, 106, and 108 may be contained within distinct areas oriented such that like surface features are not contiguous. As an example, surface feature 104 comprising a distinct area may be separated from another surface feature 104 comprising a distinct area, by at least one surface feature 106 or 108 comprising a distinct area. Orienting surface features 104, 106, and 108 such that like surface features are not contiguous may create contrast between surface features 104, 106, and 108, causing surface features 104, 106, and 108 to adopt various separate shades of color.

In one embodiment, surface features 104, 106, and 108 may be contained within any of a variety of distinct areas comprising a variety of shapes. Such shapes include regular shapes, circles, squares, rectangles, triangles, and the like. Surface features 104, 106, and 108 may be used to create or fill in letters or numbers on rubber article 100.

Surface features 104, 106, and 108 may include substantially straight lines. Surface features 104, 106, and 108 may include substantially parallel lines. Surface features 104, 106, and 108 may include curved lines. Surface features 104, 106, and 108 may include curved lines offset from one another by a substantially constant distance. Surface features 104, 106, and 108 may include curved lines such as, for example, arcs or splines. Arcs may include a substantially constant radius. Splines may include a substantially non-constant radius. Surface features 104, 106, and 108 may include curved lines and be generally curvilinear in nature. Surface features 104, 106, and 108 may include lines of substantially constant width. Surface features 104, 106, and 108 may include lines of varying width. Surface features 104, 106, and 108 may include lines of substantially constant depth or height. Surface features 104, 106, and 108 may include lines of varying depth or height. Surface features 104, 106, and 108 may include lines of substantially constant direction. Surface features 104, 106, and 108 may include lines of varying direction. Where any of surface features 104, 106, or 108 include lines of varying properties (e.g., varying width, varying depth or height, varying direction, etc.), it is understood that individual lines within the surface features may at times have changes in properties. That is, a single line may increase in width, depth, direction, or the like. Likewise, multiple lines adjacent one another may have changes in properties. That is, a first line has a first constant width, depth, direction, or the like, and an adjacent second line has a second constant width, depth, direction, or the like, which may differ from the first. Multiple lines contiguous one another may have changes in properties.

Surface features 104, 106, and 108 may include intersecting lines. Surface features 104, 106, and 108 may include any of a variety of non-linear elements, such as squares, diamonds, and irregular shapes. Surface features 104, 106, and 108 may include at least one of: a glossy finish, a carbon fiber appearance, contrasting glossy and textured lettering, shadowed lettering, a galvanized steel appearance, a knurled appearance, a leather appearance, a camouflage-shaped appearance, a leaf appearance, a tree appearance, a tree bark appearance, and any desired image capable of creation in shallow relief. In another embodiment, surface features 104, 106, and 108 are created in shallow relief.

Surface features 104, 106, and 108 may include a glossy finish. Surface features 104, 106, and 108 may include a carbon fiber appearance. Surface features 104, 106, and 108 may include contrasting glossy and textured lettering. Surface features 104, 106, and 108 may include a shadowed lettering. Surface features 104, 106, and 108 may include a galvanized steel appearance. Surface features 104, 106, and 108 may include a knurled appearance. Surface features 104, 106, and 108 may include a leather appearance. Surface features 104, 106, and 108 may include a camouflage-shaped appearance. Surface features 104, 106, and 108 may include a leaf appearance. Surface features 104, 106, and 108 may include a tree appearance. Surface features 104, 106, and 108 may include a tree bark appearance. Surface features 104, 106, and 108 may include any desired image capable of creation in shallow relief.

Shallow relief may include an element having varied depths (e.g., formed into a surface) or heights (e.g., extending from a surface), oriented so as to form an image. The shallow relief may extend to a depth of between about 0.025 mm and about 0.305 mm. In another embodiment, the shallow relief has a depth of between about 0.051 mm and about 0.254 mm. In another embodiment, the shallow relief has a depth of between about 0.102 mm and about 0.203 mm. The shallow relief may extend to a depth less than about 0.025 mm. The shallow relief may extend to a depth greater than 0.305 mm. The shallow relief may extend to a depth within any of the ranges set forth above, including for example 0.032 mm, 0.115 mm, and the like. The shallow relief may extend to a depth having any of the aforementioned values as upper and lower bounds. The shallow relief may extend to a depth in a range contained within any of the aforementioned ranges.

In one embodiment, surface features 104, 106, and 108 include elements having a depth of between about 0.025 mm and about 0.305 mm. In another embodiment, surface features 104, 106, and 108 include elements having a depth of between about 0.051 mm and about 0.254 mm. In another embodiment, surface features 104, 106, and 108 include elements having a depth of between about 0.102 mm and about 0.203 mm. Surface features 104, 106, and 108 may include elements having a depth less than about 0.025 mm. Surface features 104, 106, and 108 may include elements having a depth greater than 0.305 mm. Surface features 104, 106, and 108 may include elements having a depth within any of the ranges set forth above, including for example 0.032 mm, 0.115 mm, and the like. Surface features 104, 106, and 108 may include elements having a depth having any of the aforementioned values as upper and lower bounds. Surface features 104, 106, and 108 may include elements having a depth in a range contained within any of the aforementioned ranges.

In one embodiment, surface features 104, 106, and 108 include elements having a width of between about 0.025 mm and about 0.508 mm. In another embodiment, surface features 104, 106, and 108 include elements having a width of between about 0.127 mm and about 0.381 mm. In another embodiment, surface features 104, 106, and 108 include elements having a width of between about 0.178 mm and about 0.330 mm. Surface features 104, 106, and 108 may include elements having a width less than about 0.025 mm. Surface features 104, 106, and 108 may include elements having a width greater than 0.508 mm. Surface features 104, 106, and 108 may include elements having a width within any of the ranges set forth above, including for example 0.032 mm, 0.115 mm, and the like. Surface features 104, 106, and 108 may include elements having a width having any of the aforementioned values as upper and lower bounds. Surface features 104, 106, and 108 may include elements having a width in a range contained within any of the aforementioned ranges.

In one embodiment, surface features 104, 106, and 108 include elements having a spacing of between about 0.025 mm and about 0.609 mm. In another embodiment, surface features 104, 106, and 108 include elements having a spacing of between about 0.127 mm and about 0.508 mm. In another embodiment, surface features 104, 106, and 108 include elements having a spacing of between about 0.203 mm and about 0.432 mm. Surface features 104, 106, and 108 may include elements having a spacing less than about 0.025 mm. Surface features 104, 106, and 108 may include elements having a spacing greater than 0.609 mm. Surface features 104, 106, and 108 may include elements having a spacing within any of the ranges set forth above, including for example 0.032 mm, 0.115 mm, and the like. Surface features 104, 106, and 108 may include elements having a spacing having any of the aforementioned values as upper and lower bounds. Surface features 104, 106, and 108 may include elements having a spacing in a range contained within any of the aforementioned ranges.

In one embodiment, surface features 104, 106, and 108 may be contained within any of a variety of distinct areas comprising a variety of shapes. Such shapes include regular shapes, circles, squares, rectangles, triangles, and the like. Such shapes may include irregular shapes. Such shapes may include a combination of different regular shapes, different irregular shapes, a mixture of regular shapes and irregular shapes, or the like. Surface features 104, 106, and 108 may be used to create or fill in letters or numbers on rubber article 100.

Area 110 may include a substantially non-textured area. Area 110 may include texturing having a slight roughness common to molded rubber articles. Area 110 may have a surface with slight texturing as the result of media blasting of the mold in which the molded rubber article was formed. Area 110 may be contained within any of a variety of distinct areas comprising a variety of shapes. Such shapes include irregular shapes, regular shapes, circles, squares, rectangles, triangles, and the like. Area 110 may include irregular shapes, similar to a camouflage-shaped pattern. Area 110 may be used to create or fill in letters or numbers on rubber article 100. Area 110 may be contained within distinct areas oriented such that the distinct areas are not contiguous. The distinct areas may be separated by one or more of surface features 104, 106, and 108. Area 110 may include a gloss appearance.

The distinct areas of surface features 104, 106, or 108 may be separated from one another by a border 111. Any of the distinct areas of surface features 104, 106, or 108, or area 110, may be separated from one another by a border 111. Any of the distinct areas of surface features 104, 106, or 108, or area 110, may abut one another without border 111 oriented therebetween. Some of the distinct areas of surface features 104, 106, or 108, or area 110, may be separated from one another by a border 111, while some of the distinct areas of surface features 104, 106, or 108, or area 110 may abut one another without border 111. Border 111 may be a "gap" formed by a substantially non-textured area. Border 111 may be a raised ridge. Border 111 may be an indentation such as a channel. Border 111 may be a solid ridge extending to about the same height as surface 102 oriented near border 111. Border 111 may be raised to a height greater than the height of surface 102 oriented near border 111 (for example, to a height greater than any of surface features 104, 106, or 108, or area 110).

In one embodiment, rubber article 100 is molded using at least one mold comprising a surface. The at least one mold surface includes a negative of the desired surface of rubber article 100. Accordingly, surface features 104, 106, and 108 may correspond to a series of elements in the mold surface. Area 110 may correspond to surfaces of the mold that are substantially free of texturing, or that include light texturing (e.g., such as an acid etched texturing). Area 110 may correspond to surfaces of the mold that are polished. Polished mold surfaces may include a finish substantially equal to Society of Plastics Industry ("SPI") A-1, SPI A-2, or SPI A-3.

Figure 2:
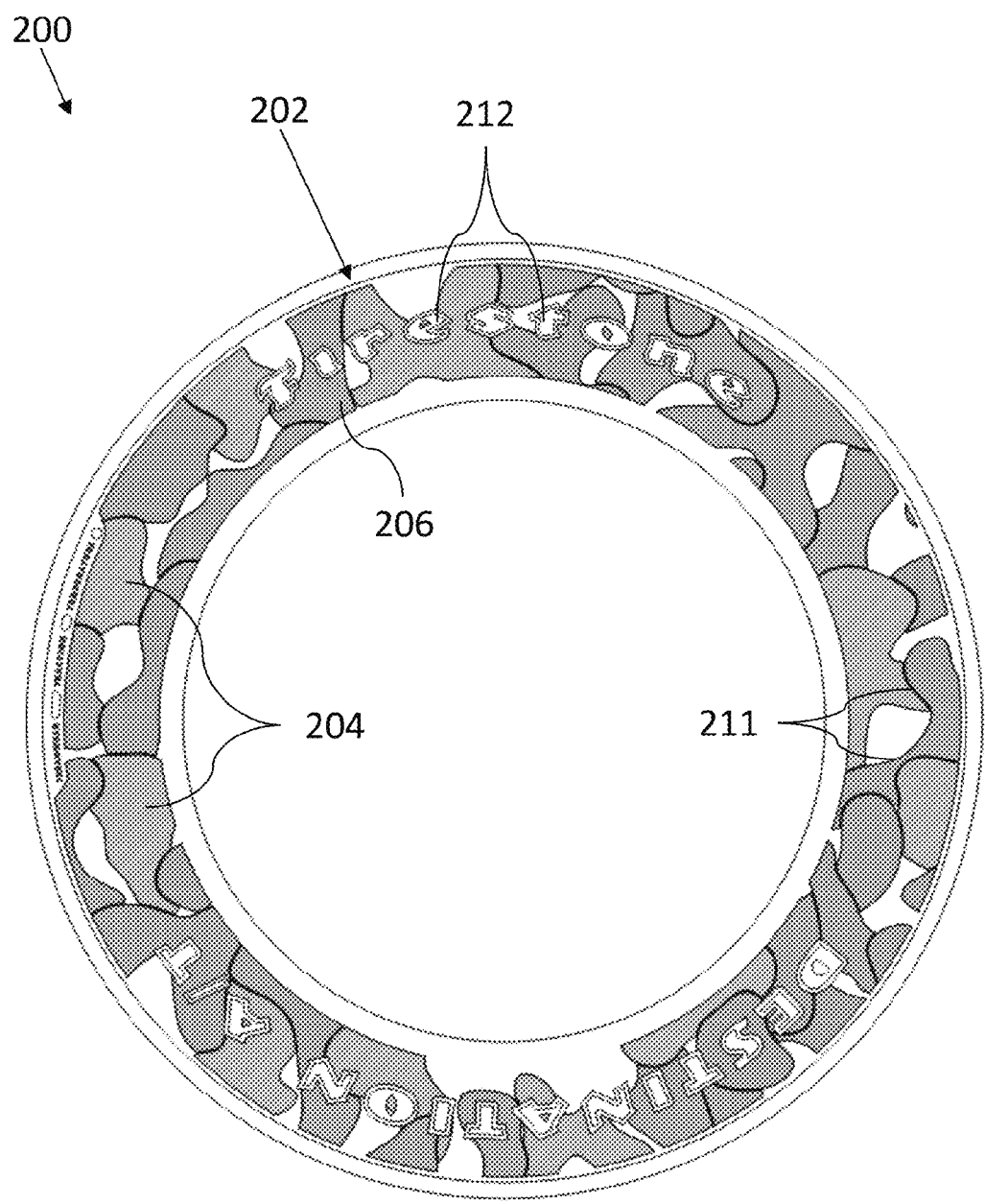
FIG. 2 illustrates a side perspective view of an example arrangement of a tire comprising at least one visual effect.

FIG. 2 illustrates a side perspective view of an example arrangement of a tire 200 comprising at least one visual effect. Tire 200 includes a sidewall 202. Sidewall 202 may include surface features 204 and 206. Surface features 204 and 206 may be separated from one another, or other portions of tire 200, or sidewall 202, by a border 211.

Sidewall 202 may additionally include at least one indicia 212. Indicia 212 may include any of a variety of symbols, including letters or numbers. Indicia 212 may include logos.

As illustrated in FIG. 2, surface feature 204 includes a lighter shade as a result of its interaction with light. Surface feature 206 includes a darker shade as a result of its interaction with light. It should be understood that as tire 200 rotates and/or the light source position changes, the surface features 204 and 206 may adopt different shades and may alternate shades, wherein one is darker than the other in a first position, and lighter than the other in a second position. Surface features 204 and 206 may create contrast in sidewall 202. Surface features 204 and 206 may be contained within any of a variety of distinct areas comprising a variety of shapes, such as for example random irregular shapes as used in a camouflage-shaped pattern. At least one of surface features 204 and 206 may include at least one surface feature including shallow relief surface features. At least one of surface features 204 and 206 may include a glossy finish. At least one of surface features 204 and 206 may include a plurality of linear elements.

At least one indicia 212 may include a substantially non-textured finish. At least one indicia 212 may include a glossy finish effected by polishing the tire sidewall mold. At least one indicia 212 may include at least one surface feature.

Surface features 204 and 206 including a glossy finish may have a depth of between about 0.000 mm and about 0.305 mm. In another embodiment, surface features 204 and 206 including a glossy finish may have a depth of between about 0.025 mm and about 0.254 mm. In another embodiment, surface features 204 and 206 including a glossy finish may have a depth of between about 0.051 mm and about 0.203 mm. Surface features 204 and 206 may include a glossy finish having a depth less than about 0.025 mm. Surface features 204 and 206 may include a glossy finish having a depth greater than about 0.305 mm. Surface features 204 and 206 may include a glossy finish having a depth within any of the ranges set forth above, including for example 0.032 mm, 0.115 mm, and the like. Surface features 204 and 206 may include a glossy finish having a range of depths having any of the aforementioned values as upper and lower bounds. Surface features 204 and 206 may include a glossy finish having a depth in a range contained within any of the aforementioned ranges.

In one embodiment, any of surface features 204, 206, and at least one indicia 212 may be applied to any portion of tire 200, including sidewall 202, a tire shoulder, a tire tread, a tire groove, a tire rib, and a tire bead area.

Figure 3:
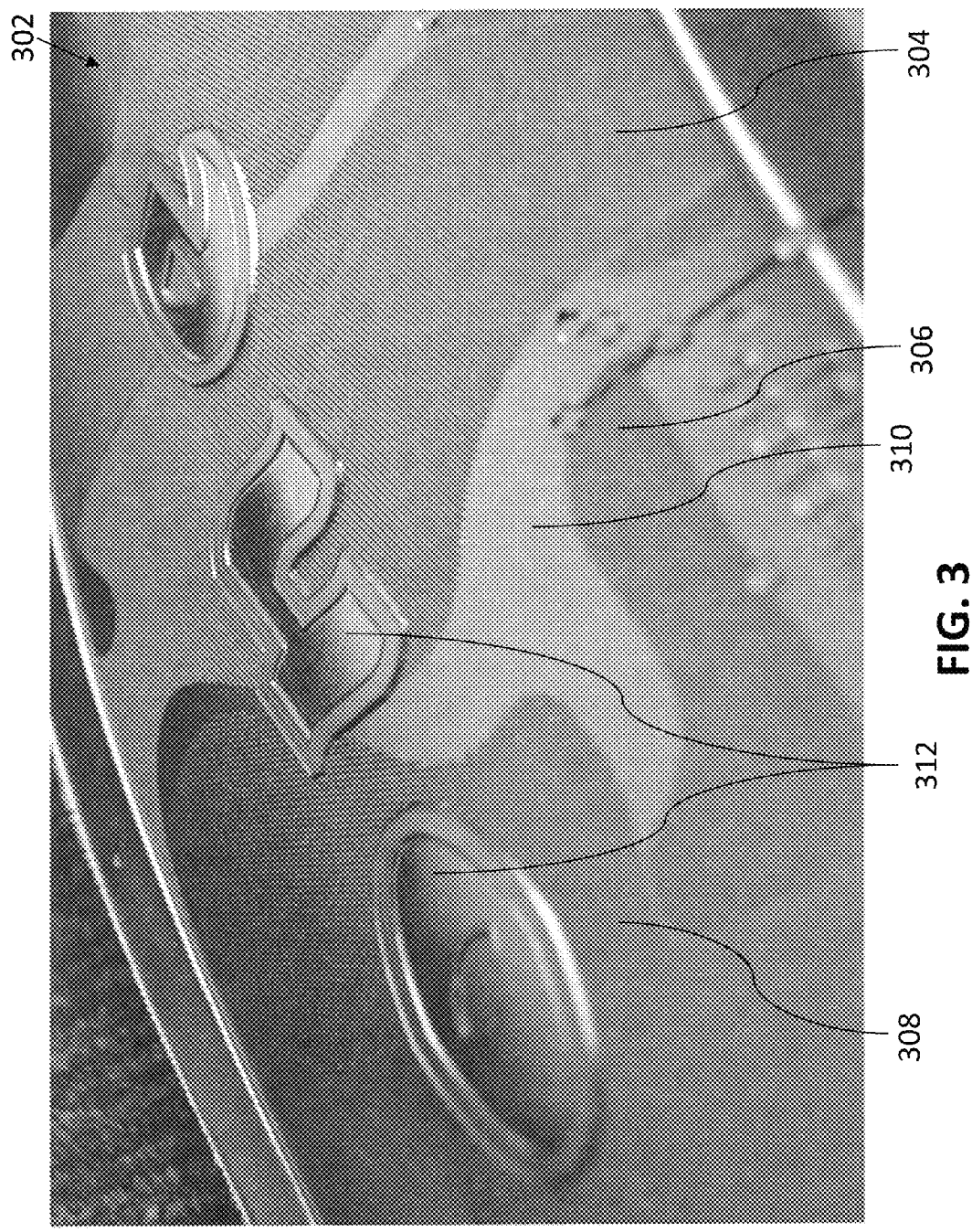
FIG. 3 illustrates a perspective view of an example arrangement of a tire comprising at least one visual effect.

FIG. 3 illustrates a side perspective view of an example arrangement of a tire sidewall 302 comprising at least one visual effect. Tire sidewall 302 may include surface features 304, 306, and 308. Tire sidewall 302 may additionally include a substantially non-textured area, such as area 310. Surface features 304, 306, or 308, or area 310, may be separated from one another, or other portions of tire sidewall 302, by a border 311. Tire sidewall 302 may additionally include at least one indicia 312.

As illustrated in FIG. 3, surface features 304, 306, and 308 may include linear elements including a series of linear protrusions and indentations oriented adjacent one another. The arrangement of the series of linear elements may create a shallow relief. Surface features 304, 306, and 308 may include liner elements, wherein the linear elements of each of surface features 304, 306, and 308 extend in different directions.

Surface feature 304 may include a lighter shade as a result of its interaction with light. Surface feature 308 may include a slightly darker shade than surface feature 304 as a result of its interaction with light. Surface feature 306 may include a slightly darker shade than surface feature 308 as a result of its interaction with light. As illustrated, area 310 may include a significantly lighter shade than any of surface features 304, 306, and 308. Area 310 may reflect light differently than surface features 304, 306, and 308 as a result of its substantially non-textured surface, or slightly textured surface, creating a lighter shade appearance.

In one embodiment, at least one indicia 312 includes a glossy surface. At least one indicia 312 may include a raised border. The raised border may surround a glossy inner surface of at least one indicia 312. As a result of its glossy finish, at least one indicia 312 may adopt mixed shades of dark and light as a result of its interaction with light. Sidewall 302 may be curved, and at least one indicia 312 may likewise curved, which may result in one portion of at least one indicia 312 adopting a lighter shade while another portion of at least one indicia 312 adopts a darker shade.

Figure 4A:
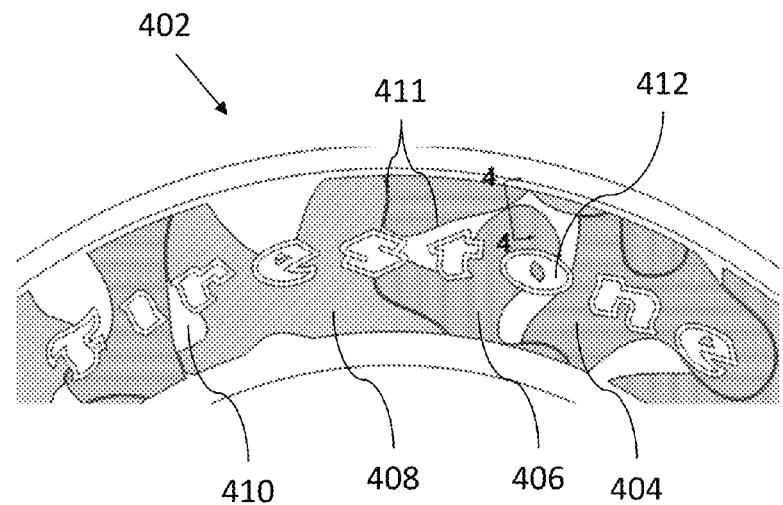
FIG. 4A illustrates a partial side view of an example arrangement of a tire sidewall 402 comprising at least one visual effect.

FIG. 4A illustrates a partial side view of an example arrangement of a tire sidewall 402 comprising at least one visual effect. Tire sidewall 402 may include surface features 404, 406, and 408. Tire sidewall 402 may additionally include a substantially non-textured area, such as area 410. Surface features 404, 406, or 408, or area 410, may be separated from one another, or other portions of tire sidewall 402, by a border 411. Tire sidewall 402 may additionally include at least one indicia 412.

Surface features 404, 406, and 408, may be oriented in distinct areas having a camouflage-shaped pattern, such that when surface features 404, 406, and 408, are oriented adjacent one another, each having slightly different and contrasting shades, a camouflaged appearance is produced on tire sidewall 402. Surface features 404, 406, and 408, may be oriented in distinct areas having a camouflage-shaped pattern, such that when surface features 404, 406, and 408, are oriented contiguous one another, a camouflaged appearance is produced on tire sidewall 402.

Figure 4B:
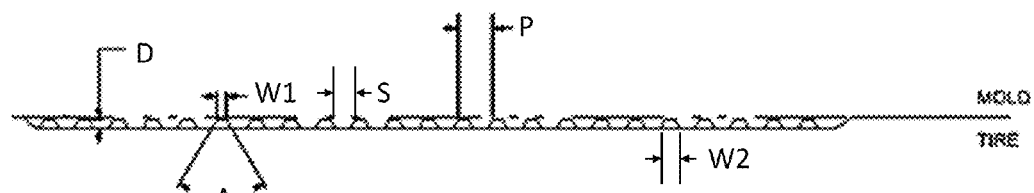
FIG. 4B illustrates an example sectional view take about section 4-4 of tire sidewall 402.

FIG. 4B illustrates an example sectional view take about section 4-4 of tire sidewall 402. Section 4-4 may include a depth D, a first width W1, a second width W2, a spacing S, a pitch P, and an angle A.

Depth D may correspond to the depth of surface features 404, 406, and 408 in tire sidewall 402. Depth D may be between about 0.025 mm and about 0.305 mm. In another embodiment, depth D may be between about 0.051 mm and about 0.254 mm. In another embodiment, depth D may be between about 0.102 mm and about 0.203 mm. In another embodiment, depth D may be about 0.200 mm. Depth D may be less than about 0.025 mm. Depth D may be greater than about 0.305 mm. Depth D may be within any of the ranges set forth above, including for example 0.032 mm, 0.115 mm, and the like. Depth D may have any of the aforementioned values as upper and lower bounds. Depth D may have a depth in a range contained within any of the aforementioned ranges.

First width W1 may correspond to the surface width of surface features 404, 406, and 408 in tire sidewall 402. First width W1 may be between about 0.025 mm and about 0.508 mm. In another embodiment, first width W1 may be between about 0.127 mm and about 0.381 mm. In another embodiment, first width W1 may be between about 0.178 mm and about 0.330 mm. In another embodiment, first width W1 may be about 0.200 mm. Width W1 may be less than about 0.025 mm. Width W1 may be greater than about 0.508 mm.

Width W1 may be within any of the ranges set forth above, including for example 0.032 mm, 0.115 mm, and the like. Width W1 may have any of the aforementioned values as upper and lower bounds. Width W1 may have a range contained within any of the aforementioned ranges.

Second width W2 may correspond to the base width of surface features 404, 406, and 408 in tire sidewall 402. Second width W2 may be between about 0.039 mm and about 0.808 mm. In another embodiment, second width W2 may be between about 0.202 mm and about 0.606 mm. In another embodiment, second width W2 may be between about 0.283 mm and about 0.525 mm. In another embodiment, second width W2 may be about 0.318 mm. Width W2 may be less than about 0.039 mm. Width W2 may be greater than about 0.808 mm. Width W2 may be within any of the ranges set forth above, including for example 0.042 mm, 0.115 mm, and the like. Width W2 may have any of the aforementioned values as upper and lower bounds. Width W2 may have a range contained within any of the aforementioned ranges.

Spacing S may correspond to the surface spacing of surface features 404, 406, and 408 in tire sidewall 402. Spacing S may be between about 0.025 mm and about 0.609 mm. In another embodiment, spacing S may be between about 0.127 mm and about 0.508 mm. In another embodiment, spacing S may be between about 0.203 mm and about 0.432 mm. In another embodiment, spacing S may be about 0.550 mm. Spacing S may be less than about 0.025 mm. Spacing S may be greater than about 0.609 mm. Spacing S may be within any of the ranges set forth above, including for example 0.042 mm, 0.115 mm, and the like. Spacing S may have any of the aforementioned values as upper and lower bounds. Spacing S may have a range contained within any of the aforementioned ranges.

Angle A may be the angle of the walls of surface features 404, 406, and 408 in tire sidewall 402. Angle A may be between about 0 degrees and 90 degrees. In another embodiment, angle A may be between about 30 degrees and about 75 degrees. In another embodiment, angle A may be between about 50 degrees and about 70 degrees. In another embodiment, angle A may be about 60 degrees. Angle A may be less than about 0 degrees. Angle A may be greater than about 90 degrees. Angle A may be within any of the ranges set forth above, including for example 7 degrees, 41 degrees, and the like. Angle A may have any of the aforementioned values as upper and lower bounds. Angle A may have a range contained within any of the aforementioned ranges.

Pitch P may correspond to the frequency of surface features 404, 406, and 408 in tire sidewall 402. Pitch P may be between about 0.300 mm and about 1.200 mm. In another embodiment, pitch P may be between about 0.500 mm and about 1.000 mm. In another embodiment, pitch P may be between about 0.650 mm and about 0.850 mm. In another embodiment, pitch P may be about 0.750 mm. Pitch P may be less than about 0.300 mm. Pitch P may be greater than about 1.200 mm. Pitch P may be within any of the ranges set forth above, including for example 0.708 mm, 1.002 mm, and the like. Pitch P may have any of the aforementioned values as upper and lower bounds. Pitch P may have a range contained within any of the aforementioned ranges.

Figure 4C:
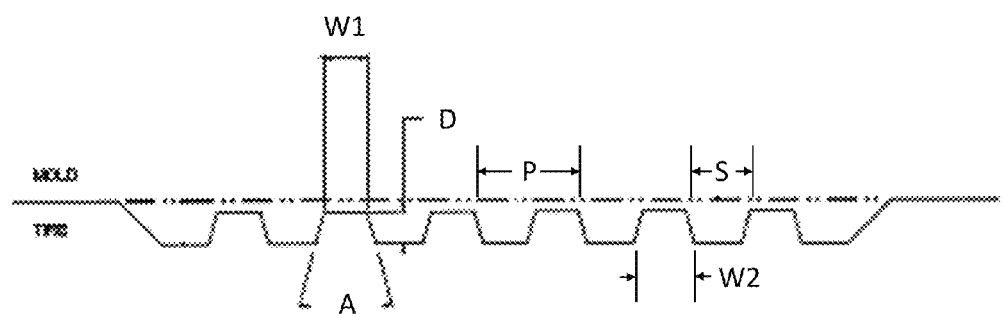
FIG. 4C illustrates an example sectional view take about section 4-4 of tire sidewall 402.

FIG. 4C illustrates an example sectional view take about section 4-4 of tire sidewall 402. Section 4-4 may include a depth D, a first width W1, a second width W2, a spacing S, a pitch P, and an angle A.

Depth D may correspond to the depth of surface features 404, 406, and 408 in tire sidewall 402. Depth D may be between about 0.015 mm and about 0.250 mm. In another embodiment, depth D may be between about 0.075 mm and about 0.200 mm. In another embodiment, depth D may be between about 0.125 mm and about 0.175 mm. In another embodiment, depth D may be about 0.150 mm. Depth D may be less than about 0.015 mm. Depth D may be greater than about 0.250 mm. Depth D may be within any of the ranges set forth above, including for example 0.032 mm, 0.115 mm, and the like. Depth D may have any of the aforementioned values as upper and lower bounds. Depth D may have a depth in a range contained within any of the aforementioned ranges.

First width W1 may correspond to the surface width of surface features 404, 406, and 408 in tire sidewall 402. First width W1 may be between about 0.025 mm and about 0.508 mm. In another embodiment, first width W1 may be between about 0.127 mm and about 0.381 mm. In another embodiment, first width W1 may be between about 0.178 mm and about 0.330 mm. In another embodiment, first width W1 may be about 0.200 mm. Width W1 may be less than about 0.025 mm. Width W1 may be greater than about 0.508 mm. Width W1 may be within any of the ranges set forth above, including for example 0.032 mm, 0.115 mm, and the like. Width W1 may have any of the aforementioned values as upper and lower bounds. Width W1 may have a range contained within any of the aforementioned ranges.

Second width W2 may correspond to the base width of surface features 404, 406, and 408 in tire sidewall 402. Second width W2 may be between about 0.039 mm and about 0.808 mm. In another embodiment, second width W2 may be between about 0.202 mm and about 0.606 mm. In another embodiment, second width W2 may be between about 0.283 mm and about 0.525 mm. In another embodiment, second width W2 may be about 0.318 mm. Width W2 may be less than about 0.039 mm. Width W2 may be greater than about 0.808 mm. Width W2 may be within any of the ranges set forth above, including for example 0.042 mm, 0.115 mm, and the like. Width W2 may have any of the aforementioned values as upper and lower bounds. Width W2 may have a range contained within any of the aforementioned ranges.

Spacing S may correspond to the surface spacing of surface features 404, 406, and 408 in tire sidewall 402. Spacing S may be between about 0.025 mm and about 0.360 mm. In another embodiment, spacing S may be between about 0.127 mm and about 0.250 mm. In another embodiment, spacing S may be between about 0.200 mm and about 0.400 mm. In another embodiment, spacing S may be about 0.300 mm. Spacing S may be less than about 0.025 mm. Spacing S may be greater than about 0.360 mm. Spacing S may be within any of the ranges set forth above, including for example 0.042 mm, 0.115 mm, and the like. Spacing S may have any of the aforementioned values as upper and lower bounds. Spacing S may have a range contained within any of the aforementioned ranges.

Angle A may be the angle of the walls of surface features 404, 406, and 408 in tire sidewall 402. Angle A may be between about 0 degrees and 90 degrees. In another embodiment, angle A may be between about 10 degrees and about 50 degrees. In another embodiment, angle A may be between about 20 degrees and about 40 degrees. In another embodiment, angle A may be about 30 degrees. Angle A may be less than about 0 degrees. Angle A may be greater than about 90 degrees. Angle A may be within any of the ranges set forth above, including for example 7 degrees, 41 degrees, and the like. Angle A may have any of the aforementioned values as upper and lower bounds. Angle A may have a range contained within any of the aforementioned ranges.

Pitch P may correspond to the frequency of surface features 404, 406, and 408 in tire sidewall 402. Pitch P may be between about 0.200 mm and about 1.000 mm. In another embodiment, pitch P may be between about 0.300 mm and about 0.750 mm. In another embodiment, pitch P may be between about 0.400 mm and about 0.600 mm. In another embodiment, pitch P may be about 0.500 mm. Pitch P may be less than about 0.200 mm. Pitch P may be greater than about 1.000 mm. Pitch P may be within any of the ranges set forth above, including for example 0.708 mm, 1.002 mm, and the like. Pitch P may have any of the aforementioned values as upper and lower bounds. Pitch P may have a range contained within any of the aforementioned ranges.

As illustrated in FIGS. 4A-4C, a pattern of elements, such as linear elements, or any of the elements described above with respect to the creation of surface features, may be implemented upon tire sidewall 402. It is contemplated that such features could be implemented upon any rubber article, and upon any portion of a tire. The pattern of elements may be dense, such that a plurality of tiny elements are oriented in close proximity to achieve a desired surface feature.

In one embodiment, tire sidewall 402 may include a reduced thickness/gauge as compared to traditional sidewalls. The gauge may be measured from the axially outermost body ply to the sidewall surface. A traditional tire sidewall gauge may be greater than, or equal to, about 3.000 mm. A traditional tire sidewall gauge may be between about 2.000 mm and about 3.000 mm.

Tire sidewall 402 may include a traditional sidewall gauge. Tire sidewall 402 may include a reduced sidewall gauge, with a value of less than or equal to about 2.000 mm. With a reduced sidewall gauge, the depth D of elements in a surface feature may be reduced to maintain enough gage between the axially outermost body ply and the environment outside the tire. Similarly, the depth D of elements in a surface feature may be reduced to maintain structural integrity of tire sidewall 402. Accordingly, a depth D of about 0.150 mm, which may be about half the depth of traditional surface features, may be necessary for use with tire sidewall 402 when using reduced gauge.

In one embodiment, minimizing depth D avoids tool breakage when making a mold for molding tire sidewall 402. Maintaining depth D at or below about 0.200 mm may avoid tool breakage when making a mold for molding tire sidewall 402.

In one embodiment, minimizing the pitch P may permit a denser pattern of elements within a surface feature. Increasing the density of elements within the surface feature may create more extreme contrast between surface features 404, 406, and 408. Minimizing the pitch P may permit the use of surface features having decreased depth D, while still achieving the contrast desired between surface features 404, 406, and 408. For example, pitch P may be reduced to about 0.500 mm.

Minimizing the pitch P may permit a denser pattern of elements, having decreased depth D, which produce a similar contrast to a less denser pattern of elements having an increased depth D.

Minimizing depth D may reduce wind resistance caused by turbulent drag, thus improving tire performance and vehicle fuel efficiency.

Minimizing angle A may allow for decreased pitch P while maximizing second width W2. Additionally, minimizing angle A may create a more defined, "sharper" interface between the walls of surface features 404, 406, and 408 and the surface of surface features 404, 406, and 408.

Figure 5:
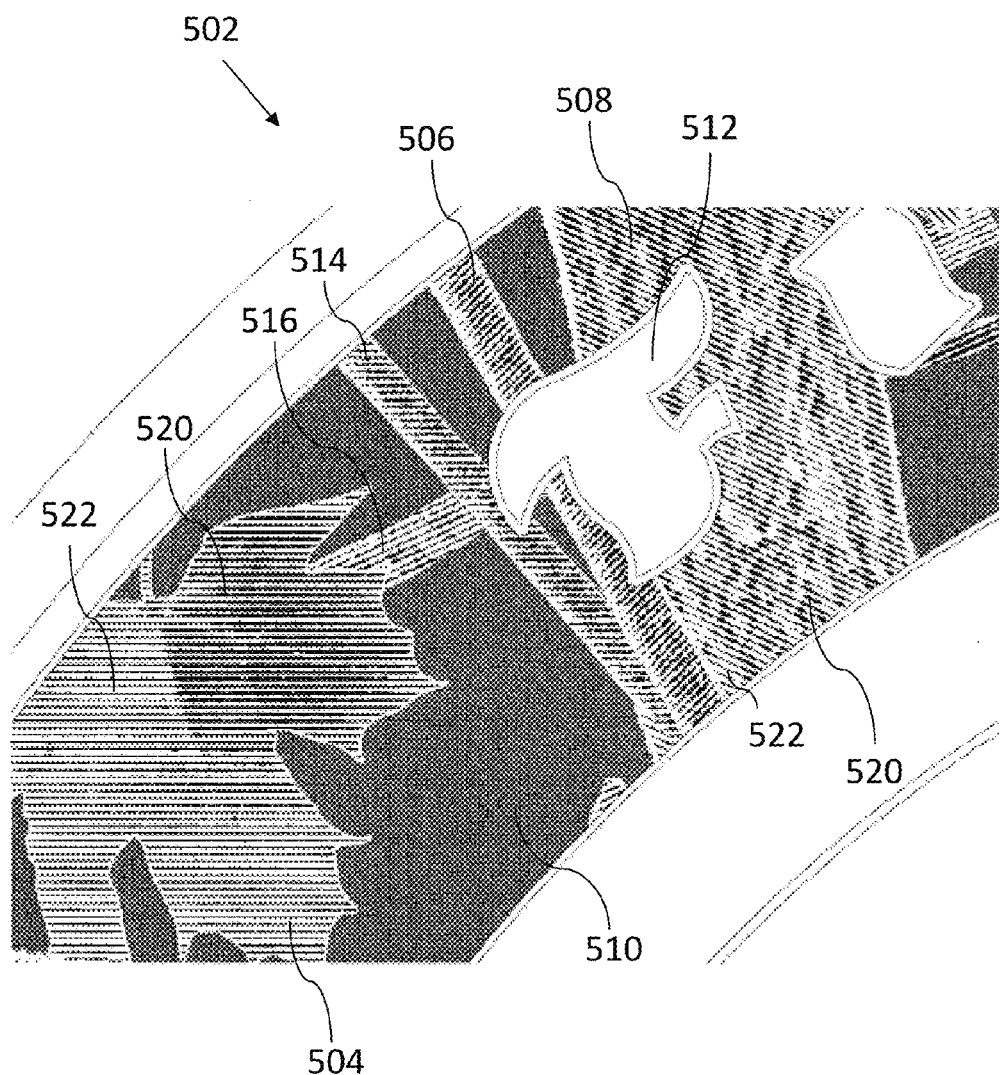
FIG. 5 illustrates a partial side view of an example arrangement of a tire sidewall comprising at least one visual effect.

FIG. 5 illustrates a partial side view of an example arrangement of a tire sidewall 502 comprising at least one visual effect. Tire sidewall 502 may include surface features 504, 506, 508, 514, and 516. Tire sidewall 502 may additionally include a substantially non-textured area, such as area 510. Tire sidewall 502 may additionally include at least one indicia 512.

Additional contrast within surface features 504, 506, 508, 514, and 516 may be achieved by varying the depth, width, and spacing of individual elements (e.g., linear elements) of surface features 504, 506, 508, 514, and 516. As illustrated, a pattern of wide lines 520 having a width nearer the upper limit of widths disclosed above may create a darker shade. Similarly, a pattern of thin lines 522 having a width nearer the lower limit of widths disclosed above may create a lighter shade. In this manner, contrast can be added within surface features 504, 506, 508, 514, and 516, even where linear elements therein may be oriented in the same direction. At least one of surface features 504, 506, 508, 514, and 516, may include linear elements in substantially parallel orientation.

Additionally, linear elements making up surface features 504, 506, 508, 514, and 516 may be selectively discontinuous, so as to create selective gaps within the linear element that result in lighter shades.

As illustrated in FIG. 5, surface features 504, 506, 508, 514, and 516 may include a leaf appearance, a tree appearance, and a tree bark appearance.

FIG. 6 illustrates a method 600 for creating a visual effect in a rubber article. Method 600 includes the steps of providing a mold for a rubber article, wherein the mold includes a negative of at least one of surface features, letters, or numbers to be provided on the rubber element, wherein the surface features, letters, or numbers include at least one of a plurality of linear elements, a plurality of non-linear elements, a glossy finish, a carbon fiber appearance, contrasting glossy and textured lettering, shadowed lettering, a galvanized steel appearance, a knurled appearance, a leather appearance, a camouflage-shaped appearance, a leaf appearance, a tree appearance, a tree bark appearance, and any desired image capable of creation in shallow relief (step 602). Uncured rubber material is applied to the mold under appropriate temperature and pressure for the requisite duration to achieve vulcanization (step 604). The surface features, letters, or numbers may include a plurality of linear elements. The surface features, letters, or numbers may include a plurality of non-linear elements. The surface features, letters, or numbers may include a glossy finish. The surface features, letters, or numbers may include a carbon fiber appearance. The surface features, letters, or numbers may include a contrasting glossy and textured lettering. The surface features, letters, or numbers may include a shadowed lettering. The surface features, letters, or numbers may include a galvanized steel appearance. The surface features, letters, or numbers may include a knurled appearance. The surface features, letters, or numbers may include a leather appearance. The surface features, letters, or numbers may include a camouflage-shaped appearance. The surface features, letters, or numbers may include a leaf appearance. The surface features, letters, or numbers may include a tree appearance. The surface features, letters, or numbers may include a tree bark appearance. The surface features, letters, or numbers may include any desired image capable of creation in shallow relief.

In one embodiment, a rubber article produced by method 600 includes shallow surface features, letters, or numbers. Such shallow surface features, letters, or numbers may result in the avoidance of stress risers in a rubber article commonly associated with deeper surface features, letters, or numbers. Reduction or avoidance of stress risers in the rubber article results in increased strength and greater overall quality of the rubber article. Additionally, shallow surface features, letters, or numbers may achieve the same or greater contrast associated with deeper surface features, letters, or numbers, thereby exhibiting the same or greater visibility as deeper surface features, letters, or numbers.

In one embodiment, shallow surface features, letters, or numbers in a rubber article require less rubber material and/or thinner rubber material necessary for achieving contrast to make surface features, letters, or numbers clearly visible. That is, additional rubber material and/or thicker rubber material is not necessary to overcome stress risers in the rubber article commonly associated with deeper surface features, letters, or numbers. Additionally, shallow surface features, letters, or numbers do not require as much rubber material to form, thereby limiting the amount of rubber material necessary in forming the rubber article. Reduction of rubber material may have benefits including reduction of resources (e.g., compositions making up rubber material) necessary to form a rubber article, and an overall lighter rubber article. Where the rubber article is a tire, reduction of weight improves fuel mileage for the vehicle using that tire. Additionally, reduction of rubber material may result in lower cost for producing the rubber article while increasing the overall quality of the article.

In one embodiment, a rubber article is produced by method 600 and includes a plurality of linear elements. The plurality of linear elements may act as natural vents allowing air to evacuate the space between the rubber material and the mold and improve the material-mold interfacing. Such natural venting may improve the overall quality of the rubber article and reduce or eliminate the need for adding vents to the mold.

In one embodiment, a rubber article is produced by method 600 and includes surface features over at least a portion of the surface of the rubber article. The surface features may act to mask natural irregularities in the rubber article caused by a splice in the mold, a splice in the rubber material, or a junction between different rubber materials. This masking of irregularities may result in an improvement of the overall quality of the rubber article.

In one embodiment, a rubber article produced by method 600 includes shallow surface features, letters, or numbers. The mold used to form the shallow surface features, letters, or numbers will have corresponding, but negative, shallow features (i.e., protrusions and indentations). Reduction of depth of mold features may result in a mold that traps less material and debris, thereby requiring less frequent cleaning, or allowing quicker cleaning, than a mold comprising conventional feature depths.

In one embodiment, a rubber article may be produced exhibiting shallow surface features, letters, and numbers applied after the molding process, and thus achieving a similar result as method 600, without implementing method 600. Such rubber article may be carved, etched, or polished to achieve the desired results.

Figure 7:
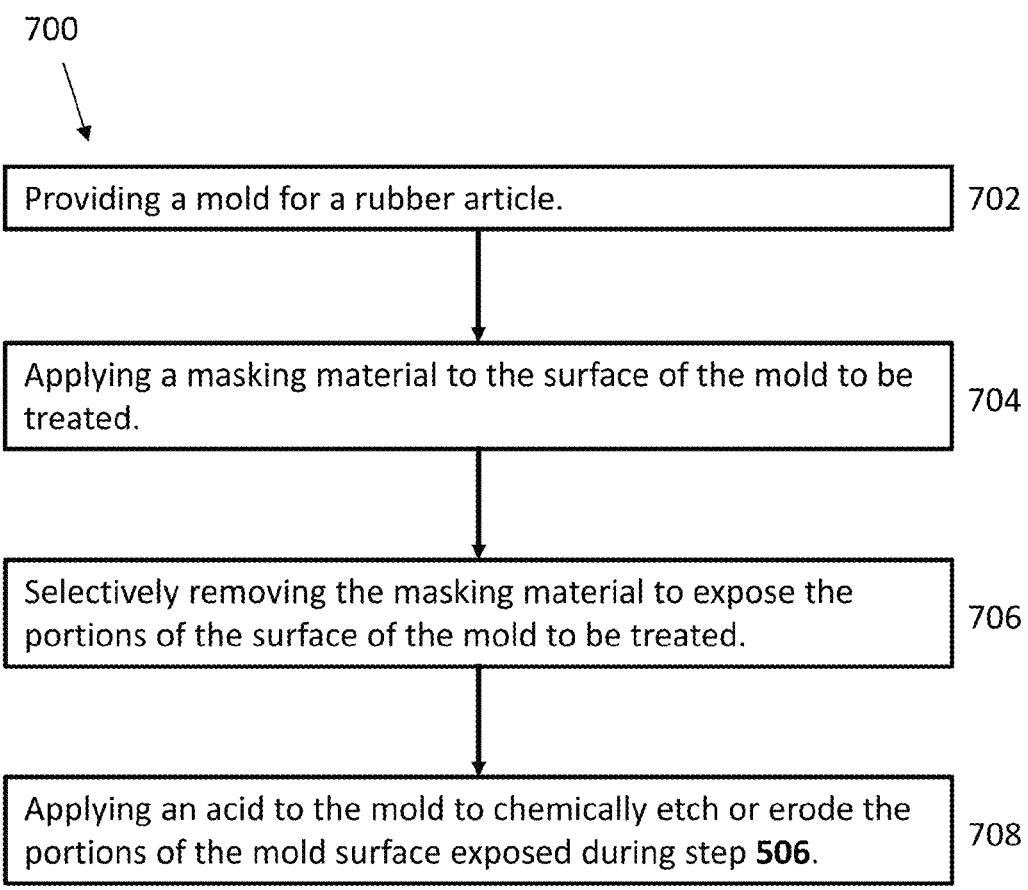
FIG. 7 illustrates a method for creating a visual effect in a rubber article through treatment of a mold.

FIG. 7 illustrates a method 700 for creating a visual effect in a rubber article through treatment of a mold. Method 700 includes the steps of providing a mold for a rubber article (step 702). A masking material is applied to the surface of the mold to be treated (step 704). The masking material is selectively removed to expose the portions of the surface of the mold to be treated (step 706). That is, if a line is to be etched into the surface of the mold, the masking material would be removed in an area corresponding to the line. An acid is applied to the mold to chemically etch or erode the portions of the mold surface exposed during step 706 (step 708). The amount of time that the mold is exposed to the acid determines the depth of features on the mold surface. That is, a shorter application time results in less depth, while a longer application time results in increased depth.

In one embodiment, method 700 is used to create a visual effect in a tire through treatment of a tire mold. The rubber article may be a tire. The mold may be a tire mold.

Method 700 may be used to etch any of the above-described surface features, numbers, or letters into the surface of the mold. Method 700 may be used to etch surface features comprising the depth, width, and spacing described above.

In one embodiment, masking material is selectively removed in step 706, using at least one of: the human hand, an engraving machine, and laser energy from a laser.

In one embodiment, the masking material applied in step 704 includes at least one of a wax coating and a paint.

In one embodiment, the acid is applied to the mold in step 708 by submerging the mold in an acid wash.

Figure 8:
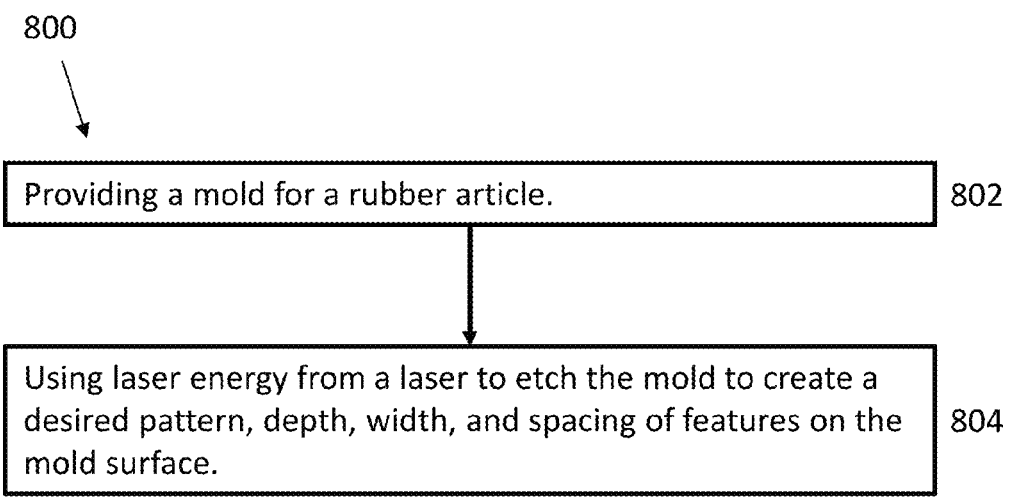
FIG. 8 illustrates a method for creating a visual effect in a rubber article through treatment of a mold.

FIG. 8 illustrates a method 800 for creating a visual effect in a rubber article through treatment of a mold. Method 800 includes the steps of providing a mold for a rubber article (step 802). Laser energy from a laser is used to etch the mold to create the desired pattern, depth, width, and spacing of features on the mold surface (step 804).

In one embodiment, method 800 is used to create a visual effect in a tire through treatment of a tire mold. The rubber article may be a tire. The mold may be a tire mold.

Method 800 may be used to etch any of the above-described surface features, numbers, or letters into the surface of the mold. Method 800 may be used to etch surface features comprising the depth, width, and spacing described above.

In one embodiment, the laser in step 804 includes multiple axes. The laser in step 804 may be capable of etching the mold at an angle that is not normal to the surface of the mold. That is, the laser is capable of applying laser energy and etching the mold at an angle to create an undercut (relative to a normal angle). Molding of a rubber article using a mold having an undercut results in a rubber article with a surface feature, letter, or number extending from the surface of the rubber article at an angle rather than orthogonally.

Figure 9:
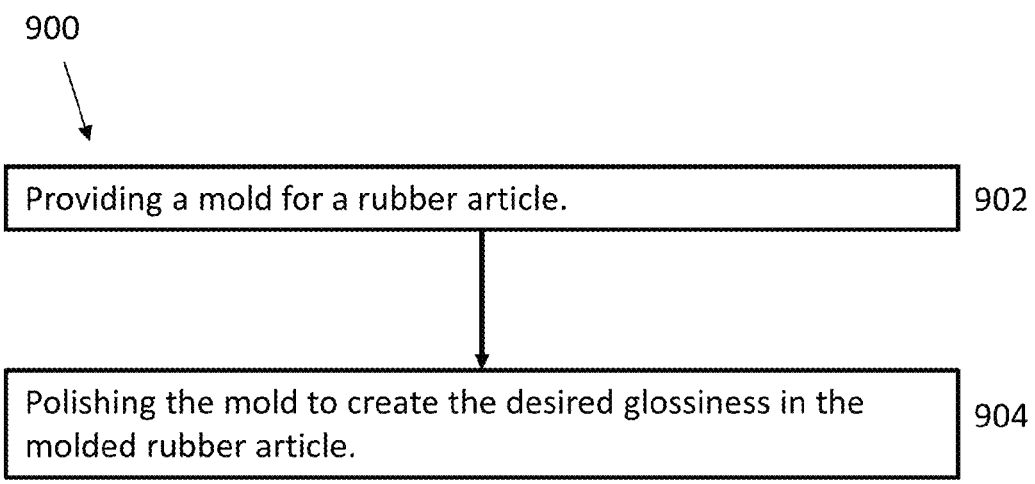
FIG. 9 illustrates a method for creating a visual effect in a rubber article through treatment of a mold.

FIG. 9 illustrates a method 900 for creating a visual effect in a rubber article through treatment of a mold. Method 900 includes the steps of providing a mold for a rubber article (step 902). The mold is polished to create the desired glossiness in the molded rubber article (step 904).

In one embodiment, method 900 is used to create a visual effect in a tire through treatment of a tire mold. The rubber article may be a tire. The mold may be a tire mold.

In one embodiment, the mold is polished to a finish substantially equal to SPI A-1, SPI A-2, or SPI A-3.

In one embodiment, the mold is polished in addition to being etched to create any of the above-described surface features, numbers, or letters in the surface of the mold. The mold may be selectively polished and etched to form the desired pattern and contrast of glossy and surface feature elements in the molded rubber article.

In one embodiment, etching of any of the above-described surface features, numbers, or letters, may be performed using an engraving machine, a milling machine, or a hand etching device. Etching using an engraving machine, a milling machine, or a hand etching device may result in surface features comprising the depth, width, and spacing described above. A mold for a rubber article, including for example a tire mold, may have negatives of surface features added to it via machining, including through use of an engraving machine, a milling machine, hand etching, and the like.

In one embodiment, a tire molded and vulcanized by conventional means may be carved or engraved to produce any of the above-described surface features, numbers, or letters. In one embodiment, a tire molded and vulcanized by conventional means may be carved or engraved to produce surface features comprising the depth, width, and spacing described above.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire having a visual effect on its outer surface, comprising a plurality of surface features including: a first surface feature and a second surface feature;
    wherein each of the surface features is contained within a distinct area;
    wherein the first surface feature includes a plurality of parallel linear elements oriented in a first direction, wherein the plurality of linear elements include a series of linear protrusions and indentations;
    wherein the second surface feature includes a plurality of parallel linear elements oriented in a second direction, wherein the plurality of linear elements include a series of linear protrusions and indentations;
    wherein the first surface feature and the second surface feature are directly adjacent one another;
    wherein a relative angle between the directions of the parallel linear elements of the directly adjacent surface features is about 90°; and
    wherein the relative angle between the directions of the parallel linear elements of the directly adjacent surface features creates a camouflage appearance having a mottled design having a pattern of varying shades of color.

2. The tire of claim 1, wherein at least one of the surface features includes at least one of the plurality of linear elements having a depth between about 0.025 mm and about 0.305 mm, a width between about 0.025 mm and about 0.508 mm, and a spacing from an adjacent linear element between about 0.025 mm and about 0.609 mm.

3. The tire of claim 1, wherein the plurality of linear elements include at least one of: substantially straight lines, curved lines, lines of substantially constant width, lines of varying width, lines of substantially constant depth, lines of varying depth, lines of substantially constant height, lines of varying height, lines of substantially constant direction, and lines of varying direction.

4. The tire of claim 1, wherein the directly adjacent surface features create shades of black or gray that contrast.

5. The tire of claim 1, further comprising at least one indicia, wherein at least a portion of the at least one indicia includes a glossy finish.

6. The tire of claim 1, wherein at least a portion of the surface further includes at least one of: a substantially non-textured finish, a slightly textured finish, and a glossy finish.

7. The tire of claim 1, wherein the outer surface further includes at least a portion of a sidewall of the tire.

8. A tire having a visual effect on its outer surface, comprising a plurality of surface features including: a first surface feature, a second surface feature, and a third surface feature;
    wherein each of the surface features is contained within a distinct area;
    wherein the at least one first surface feature includes a plurality of parallel linear elements oriented in a first direction, wherein the plurality of linear elements include a series of linear protrusions and indentations;
    wherein the at least one second surface feature includes a plurality of parallel linear elements oriented in a second direction, wherein the plurality of linear elements include a series of linear protrusions and indentations;
    wherein the at least one third surface feature includes a plurality of parallel linear elements oriented in a third direction, wherein the plurality of linear elements include a series of linear protrusions and indentations;
    wherein at least two of the first surface feature, the second surface feature, and the third surface feature are directly adjacent one another;
    wherein a relative angle between the directions of the parallel linear elements of directly adjacent surface features is at least one of: about 45° and about 90°; and
    wherein the relative angle between the directions of the parallel linear elements of the directly adjacent surface features creates a camouflage appearance having a mottled design having a pattern of varying shades of color.

9. The tire of claim 8, wherein at least one of the surface features includes at least one of the plurality of linear elements having a depth between about 0.025 mm and about 0.305 mm, a width between about 0.025 mm and about 0.508 mm, and a spacing from an adjacent linear element between about 0.025 mm and about 0.609 mm.

10. The tire of claim 8, wherein the plurality of linear elements include at least one of: substantially straight lines, curved lines, lines of substantially constant width, lines of varying width, lines of substantially constant depth, lines of varying depth, lines of substantially constant height, lines of varying height, lines of substantially constant direction, and lines of varying direction.

11. The tire of claim 8, wherein the directly adjacent surface features create shades of black or gray that contrast.

12. The tire of claim 8, further comprising at least one indicia, wherein at least a portion of the at least one indicia comprises a glossy finish.

13. The tire of claim 8, wherein at least a portion of the surface further includes at least one of: a substantially non-textured finish, a slightly textured finish, and a glossy finish.

14. The tire of claim 8, wherein the outer surface further includes at least a portion of a sidewall of the tire.

15. A tire having a visual effect on its outer surface, comprising a plurality of surface features including: a first surface feature, a second surface feature, a third surface feature, and a fourth surface feature;
   wherein each of the surface features is contained within a distinct area;
   wherein the at least one first surface feature includes a plurality of parallel linear elements oriented in a first direction, wherein the plurality of linear elements include a series of linear protrusions and indentations;
   wherein the at least one second surface feature includes a plurality of parallel linear elements oriented in a second direction, wherein the plurality of linear elements include a series of linear protrusions and indentations;
   wherein the at least one third surface feature includes a plurality of parallel linear elements oriented in a third direction, wherein the plurality of linear elements include a series of linear protrusions and indentations;
   wherein the at least one fourth surface feature includes a plurality of parallel linear elements oriented in a fourth direction, wherein the plurality of linear elements include a series of linear protrusions and indentations;
   wherein at least two of the first surface feature, the second surface feature, the third surface feature, and the fourth surface feature are directly adjacent one another;
   wherein a relative angle between the directions of the parallel linear elements of directly adjacent surface features is at least one of: about 30°, about 60°, and about 90°; and
   wherein the relative angle between the directions of the parallel linear elements of the directly adjacent surface features creates a camouflage appearance having a mottled design having a pattern of varying shades of color.

16. The tire of claim 15, wherein at least one of the surface features includes at least one of the plurality of linear elements having a depth between about 0.025 mm and about 0.305 mm, a width between about 0.025 mm and about 0.508 mm, and a spacing from an adjacent linear element between about 0.025 mm and about 0.609 mm.

17. The tire of claim 15, wherein the plurality of linear elements include at least one of: substantially straight lines, curved lines, lines of substantially constant width, lines of varying width, lines of substantially constant depth, lines of varying depth, lines of substantially constant height, lines of varying height, lines of substantially constant direction, and lines of varying direction.

18. The tire of claim 15, wherein the directly adjacent surface features create shades of black or gray that contrast.

19. The tire of claim 15, further comprising at least one indicia, wherein at least a portion of the at least one indicia includes a glossy finish.

20. The tire of claim 15, wherein at least a portion of the surface further includes at least one of: a substantially non-textured finish, a slightly textured finish, and a glossy finish.

21. The tire of claim 15, wherein the outer surface further includes at least a portion of a sidewall of the tire.

* * * * *